No. 718,322. PATENTED JAN. 13, 1903.
J. B. DAVIS.
ATTACHMENT FOR LEADING BICYCLES.
APPLICATION FILED NOV. 28, 1902.
NO MODEL.
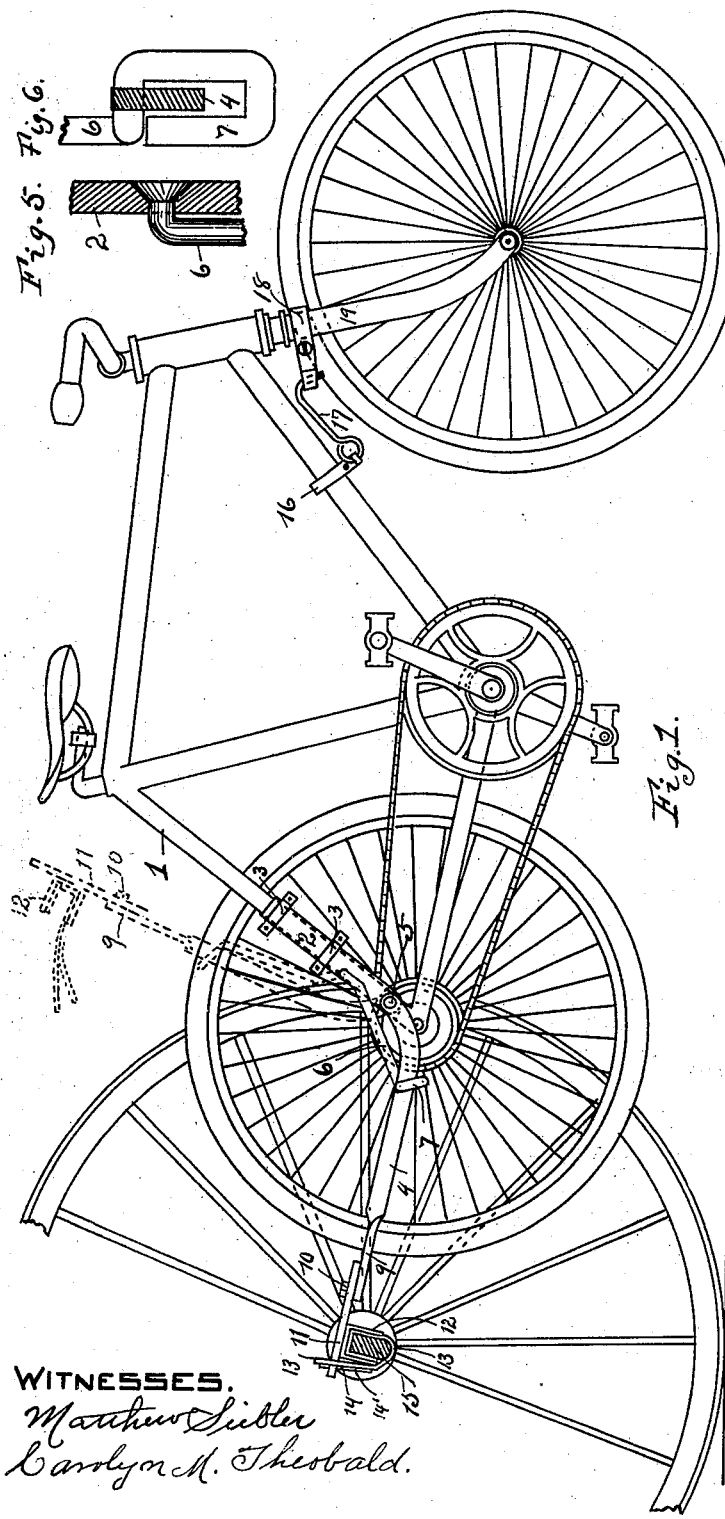
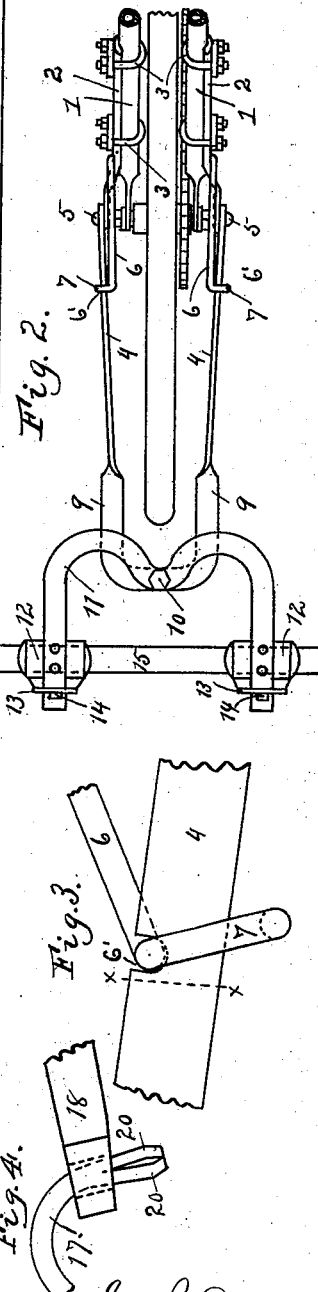
INVENTOR
ATTORNEY
WITNESSES.

UNITED STATES PATENT OFFICE.

JOHN B. DAVIS, OF DAYTON, OHIO.

ATTACHMENT FOR LEADING BICYCLES.

SPECIFICATION forming part of Letters Patent No. 718,322, dated January 13, 1903.

Application filed November 28, 1902. Serial No. 133,110. (No model.)

*To all whom it may concern:*

Be it known that I, JOHN B. DAVIS, a citizen of the United States, residing at Dayton, in the county of Montgomery and State of Ohio, have invented certain new and useful Improvements in Attachments for Leading Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in bicycle attachments for leading a bicycle in the rear of vehicles.

The object of the invention is to provide an attachment for connecting the bicycle to the vehicle whereby the gearing of the bicycle is relieved from a useless operation during the period in which said bicycle is being led, and, further, to prevent a jumping or bouncing of the bicycle due to the same passing over uneven ground while being led. This bouncing or jumping of the bicycle is due to the two wheels of the bicycle being upon the ground and the absence of any weight on said bicycle, it being borne in mind that when the bicycle is being led it is minus the rider.

Preceding a detail description of my invention reference is made to the accompanying drawings, of which—

Figure 1 is a side elevation of a bicycle and the rear axle and one of the wheels of the vehicle, showing my attachment connecting the bicycle in a position to be led by the vehicle. Fig. 2 is a top plan view showing the attachment connected to the rear axle of the vehicle and to the bicycle. Fig. 3 is a top plan view of a portion of the attachment. Fig. 4 is a detail view of parts of the device for locking the front wheel of the bicycle to prevent the same from turning when being led. Fig. 5 is a detail view of a feature of the attachment. Fig. 6 is a detail sectional view of a feature of the attachment on the line *x x* of Fig. 3.

In a detail description of the invention similar reference characters indicate corresponding parts.

The attachment may be applied to either the front or rear fork of a bicycle. In the drawings it is shown as attached to the rear fork 1 of said bicycle. This is preferable, owing to the fact that the gearing is relieved from operation during the time in which the bicycle is being led. Therefore a useless wear of the gearing is avoided, and the rear of the vehicle is protected from receiving mud when the bicycle is being led in wet weather.

2 2 designate two bars which conform to the curvature of the outer surfaces of the rear fork 1 and are rigidly secured to said fork by means of clamps 3, which make a rigid connection between said fork and said bars. The lower ends of said bars 2 2 have headed pivots 5 projecting therefrom, by means of which a pivotal connection is obtained between said bars 2 and the leading-fork 4. The said leading-fork has its forward end terminating in a yoke 9, the said yoke being formed by twisting that end to present flat sides of the fork in a horizontal plane. The said fork 4 is connected to a bow 11 by a pivot 10, so that said fork may have any necessary lateral movement in leading a bicycle out of a straight line. The bow 11 has secured to its ends bent metallic plates 12, which embrace three sides of the vehicle-axle 15. The interior of these angular plates is lined with a suitable material, such as leather, which terminates in tongues 13, through which the extreme ends of the bow 11 pass. These extreme ends of said bow are provided with openings 14, through which tongues 14' pass, said tongues 14' being constructed of leather and secured to the tongues 13, as shown in Fig. 1. The object of this manner of connecting the bow 11 with the rear axle 15 is to avoid any marring of the said axle that might be due to the attachment. It will be readily seen that the bow 11 has a rigid connection and that the leading-fork 4 is free to move in either direction laterally by reason of the pivot 10.

6 6 designate two brace-arms, which are pivoted to the bars 2 at one end, as shown in Fig. 5, and the other ends of said brace-arms terminate in loops 7, as shown in Fig. 6, and surround the arms of the leading-fork 4. These brace-arms 6 serve to hold the fork 4 in a position to elevate from the ground the wheel of the bicycle, as shown in Fig. 1, by engaging in a notch 6' in the upper edge of the arms of said fork. (See Fig. 3.) The fork 4 is thus prevented from assuming an inclined or upper position, and thereby permitting the adjacent wheel of the bicycle to rest upon the ground when the attachment is connected to the vehicle, as shown in Fig. 1. It will be understood that if the loop ends 7 of said brace-arms 6 were disengaged from the notches 6' in the fork 4 the said arms would slide forwardly or rearwardly of the notches 6' and would thus permit the wheel of the bicycle to engage with the ground; but when the said brace-arms engage with said notches 6' they stay the upward movement of the fork 4 and hold it rigid against any rising movement when the attachment is connected with the rear axle of the vehicle.

It will be understood that the attachment is especially serviceable in livery stables as a means for attaching the bicycle in the rear of a vehicle for the person to return upon whose duty it is to deliver a vehicle to a customer. In disconnecting the bicycle for such person to use in returning to the stable the bow 11 is uncoupled from the shaft of the vehicle and the brace-arms 6 are lifted out of the notches in the fork 4. The attachment is then elevated on the pivots 5 to a position against the rear fork 1 of the bicycle.

The dotted lines in Fig. 1 represent the attachment in the act of being elevated against the rear fork of the bicycle.

In conducting the bicycle in the rear of the vehicle it is essential that the front wheel be prevented from turning on its pivot. I therefore provide means for locking the front fork of the bicycle in a straight position, and thereby maintain the front wheel in a straight position relatively to the frame of the bicycle. This device consists of a clamp 16, which is rigidly secured to the lower forward inclined tube of the bicycle-frame, and a similar clamp 18, which is secured to the upper portion of the front fork 19. Between these two clamps there is placed a hook 17, one end of which is permanently linked to the clamp 16 and the other end of which hooks into an eye on the clamp 18. The end of said hook which engages with the clamp 18 is constructed of two parts 20, as shown in Fig. 4, which has a suitable spring nature to expand to thus prevent said hook from becoming detached from the clamp 18.

Having described my invention, I claim—

1. In an attachment for leading a bicycle, the combination with a fork of a bicycle, a leading-fork pivotally connected at opposite sides of said bicycle-fork, a bow attachable to a vehicle, a pivotal connection between said bow and the leading-fork, whereby said leading-fork is permitted to have the necessary lateral movement in leading a bicycle, and brace-arms pivoted at opposite sides of the bicycle-fork and adapted to hold said leading-fork in a proper position to maintain the adjacent wheel of the bicycle in an elevated position, substantially as specified.

2. In an attachment for leading bicycles, the combination with a fork of a bicycle, of a leading-fork pivotally attached at opposite sides of said bicycle-fork, brace-arms pivoted at opposite sides of the bicycle-fork and holding said leading-fork in an operative position when leading a bicycle, a bow attachable to the rear axle of a vehicle, a pivotal connection between said bow and the leading-fork, and means for enabling a proper engagement of the brace-arms with the leading-fork when leading a bicycle, substantially as specified.

3. In an attachment for leading bicycles, the combination with a fork of a bicycle, of bars rigidly secured to opposite sides of said bicycle-fork, a leading-fork pivotally connected to said bars, brace-arms pivotally connected to said bars and engaging said leading-fork to maintain the same in an operative position, a bow attachable to the rear axle of a vehicle, and a pivotal connection between said bow and the leading-fork, substantially as specified.

4. In an attachment for leading bicycles, the combination with a bicycle-fork, of a leading-fork pivotally connected at opposite sides of said bicycle-fork, brace-arms pivotally connected at opposite sides of said bicycle-fork at points above the pivotal connection of the leading-fork, said brace-arms having their lower ends formed in loops adapted to engage the leading-fork, a bow securable to the rear axle of a vehicle, and a pivotal connection between said yoke and the leading-fork, substantially as specified.

5. In an attachment for leading a bicycle, the combination with a fork of a bicycle, of a leading-fork pivotally connected at opposite sides of said bicycle-fork, brace-arms adapted to maintain said leading-fork in an operative position to elevate one wheel of a bicycle from the ground, a bow attachable to the rear axle of a vehicle, a pivotal connection between said bow and the leading-fork, and means for maintaining the running wheel of the bicycle in a straight position relatively to the elevated wheel, substantially as specified.

6. In an attachment for leading a bicycle, the combination with a bicycle-fork, of bars rigidly secured to opposite sides of said fork, of a leading-fork having a pivotal connection with said bars, brace-arms having a pivotal connection with said bars and adapted to maintain the leading-fork in an operative position, a bow attachable to a vehicle-axle, and means for maintaining the running wheel of the bicycle in a straight position relatively to the elevated wheel, substantially as specified.

In testimony whereof I affix my signature in presence of two witnesses.

JOHN B. DAVIS.

Witnesses:
  R. J. McCarty,
  C. B. Nevin.